United States Patent
Khafagy et al.

(10) Patent No.: US 10,994,610 B2
(45) Date of Patent: May 4, 2021

(54) METHODS AND SYSTEM FOR AUTOMATICALLY STOPPING AN ENGINE

(71) Applicant: Ford Global Technologies, LLC, Dearborn, MI (US)

(72) Inventors: Hafiz Shafeek Khafagy, Dearborn, MI (US); Eric Michael Rademacher, Beverly Hills, MI (US); Ahmed Awadi, Farmington Hills, MI (US); Hussam Makkiya, Dearborn, MI (US); Daniel Borrello, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 25 days.

(21) Appl. No.: 16/509,238

(22) Filed: Jul. 11, 2019

(65) Prior Publication Data
US 2021/0008980 A1 Jan. 14, 2021

(51) Int. Cl.
*B60K 26/00* (2006.01)
*F02N 11/08* (2006.01)
*B60T 8/17* (2006.01)

(52) U.S. Cl.
CPC .......... *B60K 26/00* (2013.01); *F02N 11/0818* (2013.01); *B60T 8/17* (2013.01); *B60Y 2300/18108* (2013.01); *B60Y 2300/45* (2013.01); *F02N 2200/061* (2013.01); *F02N 2200/0801* (2013.01)

(58) Field of Classification Search
CPC ....... F02N 2200/061; F02N 2200/0801; F02N 11/0818; B60Y 2300/46; B60K 26/00
See application file for complete search history.

(56) References Cited

U.S. PATENT DOCUMENTS

| | | | | |
|---|---|---|---|---|
| 6,230,496 | B1* | 5/2001 | Hofmann | B60K 6/28 60/706 |
| 9,181,915 | B2* | 11/2015 | Dupuy | F02D 29/02 |
| 2010/0087288 | A1* | 4/2010 | Yamamoto | B60L 15/20 477/3 |
| 2012/0203414 | A1* | 8/2012 | Akutsu | B60W 10/08 701/22 |
| 2018/0043878 | A1* | 2/2018 | Khafagy | F02N 11/084 |
| 2018/0334158 | A1 | 11/2018 | Chen et al. | |
| 2019/0351893 | A1* | 11/2019 | Kim | B60W 20/15 |
| 2020/0301416 | A1* | 9/2020 | Endo | B60W 50/082 |

FOREIGN PATENT DOCUMENTS

EP 1647707 A1 4/2006

OTHER PUBLICATIONS

Khafagy, H. et al., "Methods and System for Automatically Stopping an Engine," U.S. Appl. No. 16/277,313, filed Feb. 15, 2019, 43 pages.

* cited by examiner

*Primary Examiner* — Stacey A Fluhart
(74) *Attorney, Agent, or Firm* — Geoffrey Brumbaugh; McCoy Russell LLP

(57) ABSTRACT

Systems and methods for operating a vehicle that includes an engine that may be automatically stopped and started are described. In one example, an engine may be automatically stopped in response to an electric assisted braking threshold level that is adjusted responsive to vehicle speed so that opportunities to automatically stop an engine may be increased, thereby conserving fuel.

17 Claims, 7 Drawing Sheets

METHODS AND SYSTEM FOR AUTOMATICALLY STOPPING AN ENGINE

FIELD

The present description relates to methods and a system for a vehicle that includes an engine that may be automatically stopped and started.

BACKGROUND AND SUMMARY

A vehicle's engine may be automatically stopped when the vehicle is moving to conserve fuel, but the braking force required to stop and hold the vehicle may be different when the vehicle is moving as compared to when the vehicle is already stopped. For example, a higher braking force may be applied to stop the vehicle at a desired rate when the vehicle is traveling at 30 kilometers per hour and a lower braking force may be applied to reduce the possibility of a vehicle moving when the vehicle already stopped. However, if automatic engine stopping is provided only when the highest levels of braking capacity are present, then the opportunities to automatically stop the engine and reduce engine fuel consumption may be less than may be desired. Consequently, vehicle fuel efficiency may be reduced.

The inventors herein have recognized the above-mentioned issues and have developed an engine operating method, comprising: automatically stopping an engine via a controller in response to an available electric assisted braking force being greater than a first threshold when a speed of a vehicle is less than a vehicle speed threshold; and automatically stopping the engine via the controller in response to the available electric assisted braking force being greater than a second threshold when the speed of the vehicle is greater than the vehicle speed threshold.

By automatically stopping an engine in response to an available electric assisted braking force being greater than a first threshold when a speed of the vehicle is less than a vehicle speed threshold, and automatically stopping the engine in response to the available electric assisted braking force being greater than a second threshold when the speed of the vehicle is greater than the vehicle threshold speed, it may be possible to provide the technical result of providing a desired level of vehicle braking when the vehicle is moving without having to store large amounts of electrical charge. Further, the engine may be stopped when the vehicle is stopped even though the available electric assisted braking force may be lower since the vehicle may remain stopped even when only a small amount of electric assisted braking force is available.

The present description may provide several advantages. In particular, the approach may adjust an electric assisted braking force threshold based on vehicle operating conditions so that desired braking forces may be available during a wide variety of operating conditions without wasting energy. Thus, the variable electric assisted braking force threshold may optimize braking force for vehicle operating conditions, thereby increasing vehicle fuel efficiency by allowing an engine to stop more frequently. Further, the approach may provide a desirable level of vehicle braking even when the engine is deactivated. In addition, the approach may provide desired levels of vehicle braking whether the engine is stopped at a higher vehicle speed or a lower vehicle speed.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 2:
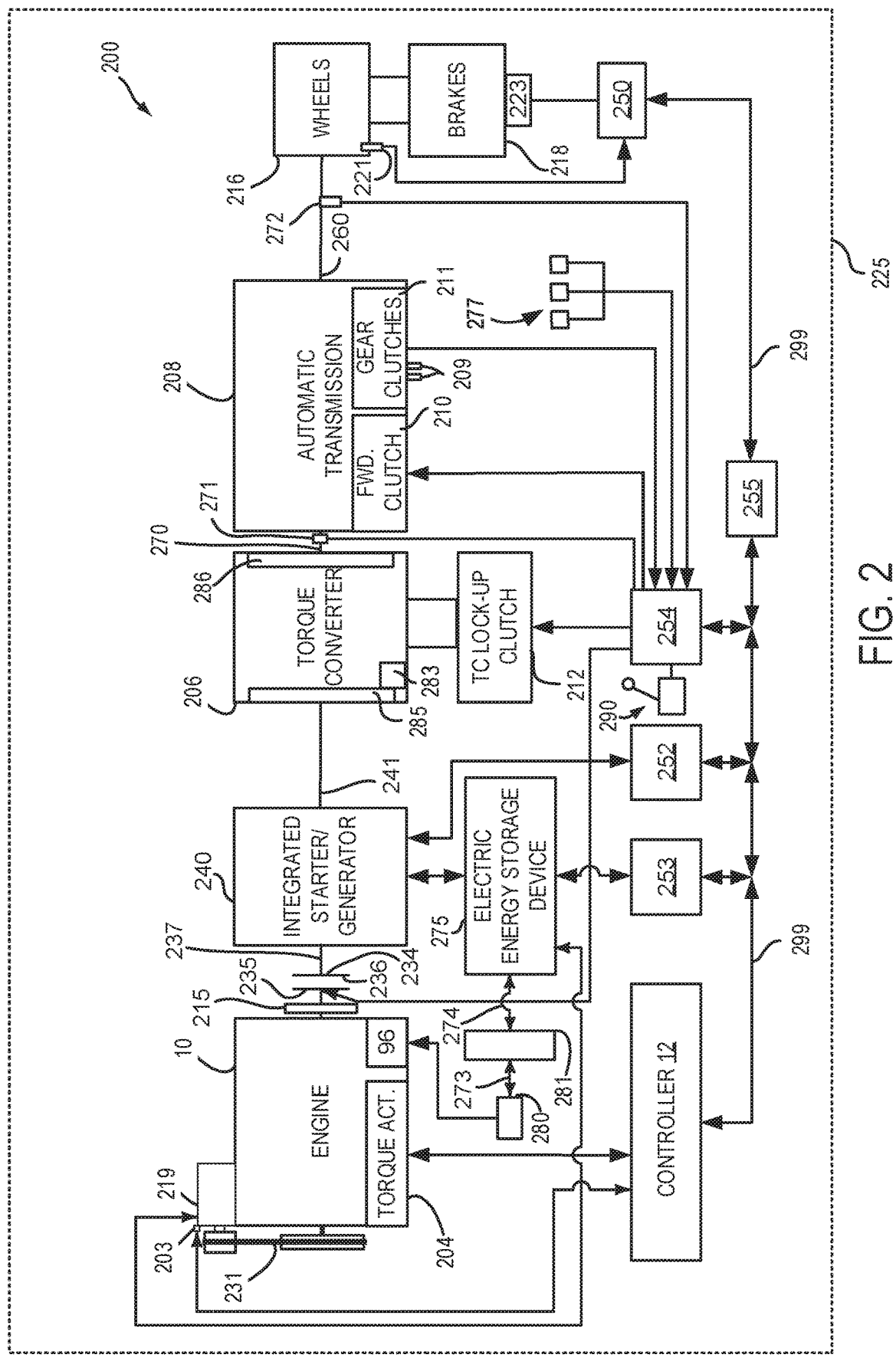
FIG. 2 is a schematic diagram of a first vehicle driveline.
Figure 3:
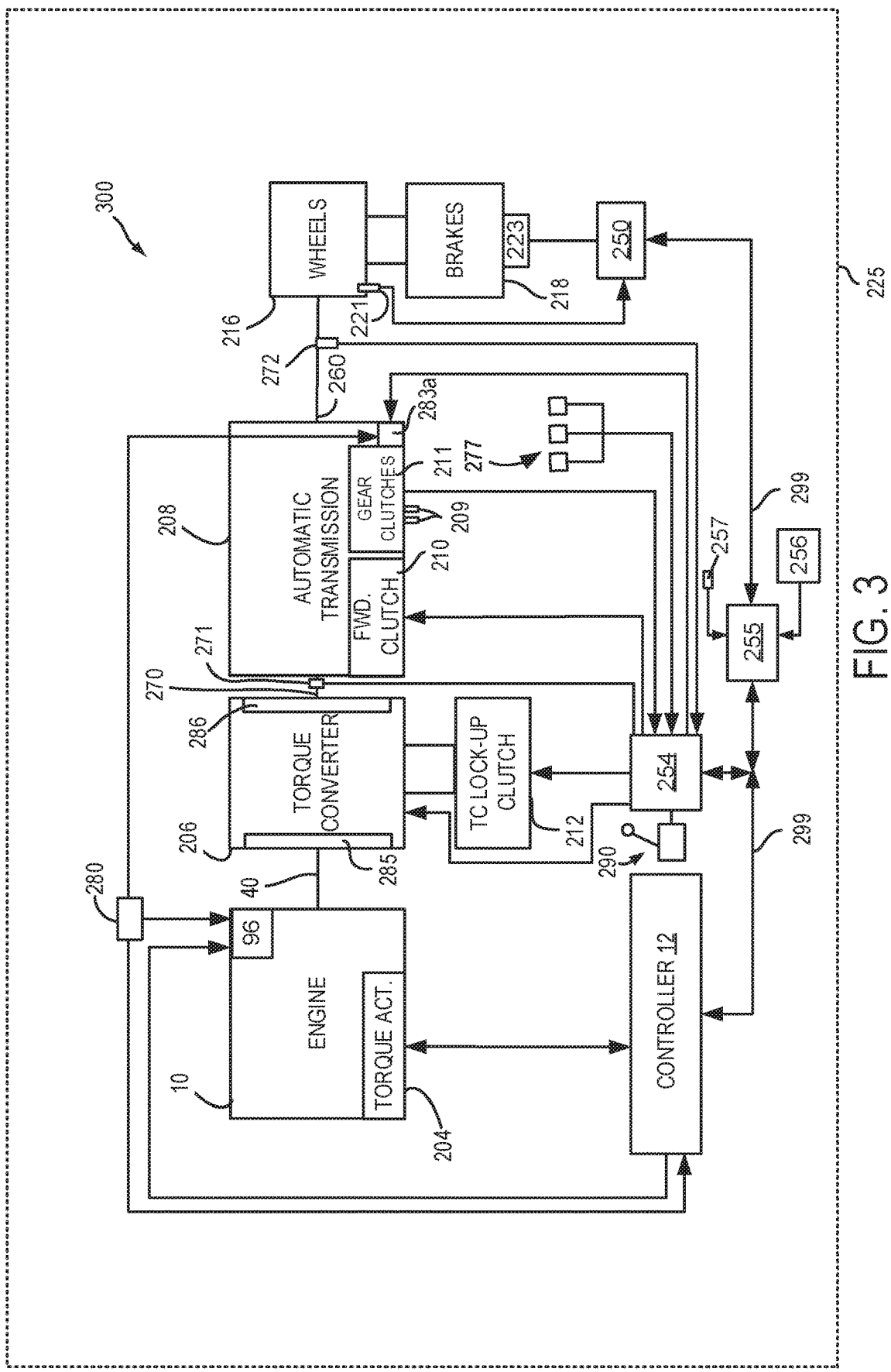
FIG. 3 is a schematic diagram of a second vehicle driveline.

The present description is related to operating a vehicle that includes an engine that may be automatically stopped (e.g., the engine may be stopped (ceasing combustion and rotating) in response to vehicle operating conditions via a controller without a human or autonomous driver specifically requesting an engine stop via a dedicated input that has sole function(s) for stopping and starting the engine, such as a pushbutton or key switch) and automatically started (e.g., the engine may be started (rotating and combusting fuel) in response to vehicle operating conditions via a controller without a human or autonomous driver specifically requesting an engine start via a dedicated input that has sole function(s) for stopping and starting the engine, such as a pushbutton or key switch). The approach may dynamically adjust an electric assisted braking force threshold level responsive to vehicle speed so that a desired amount of braking assist may be made available without having to store excess electric charge. The vehicle may include an engine of the type shown in FIG. 1. The engine may be included in a driveline as shown in FIG. 2 or FIG. 3. The vehicle may operate according to the sequences of FIGS. 4A and 4B. The vehicle may be operated according to the method of FIG. 5 or the method of FIGS. 6 and 7 to improve opportunities to automatically stop an engine.

Figure 1:
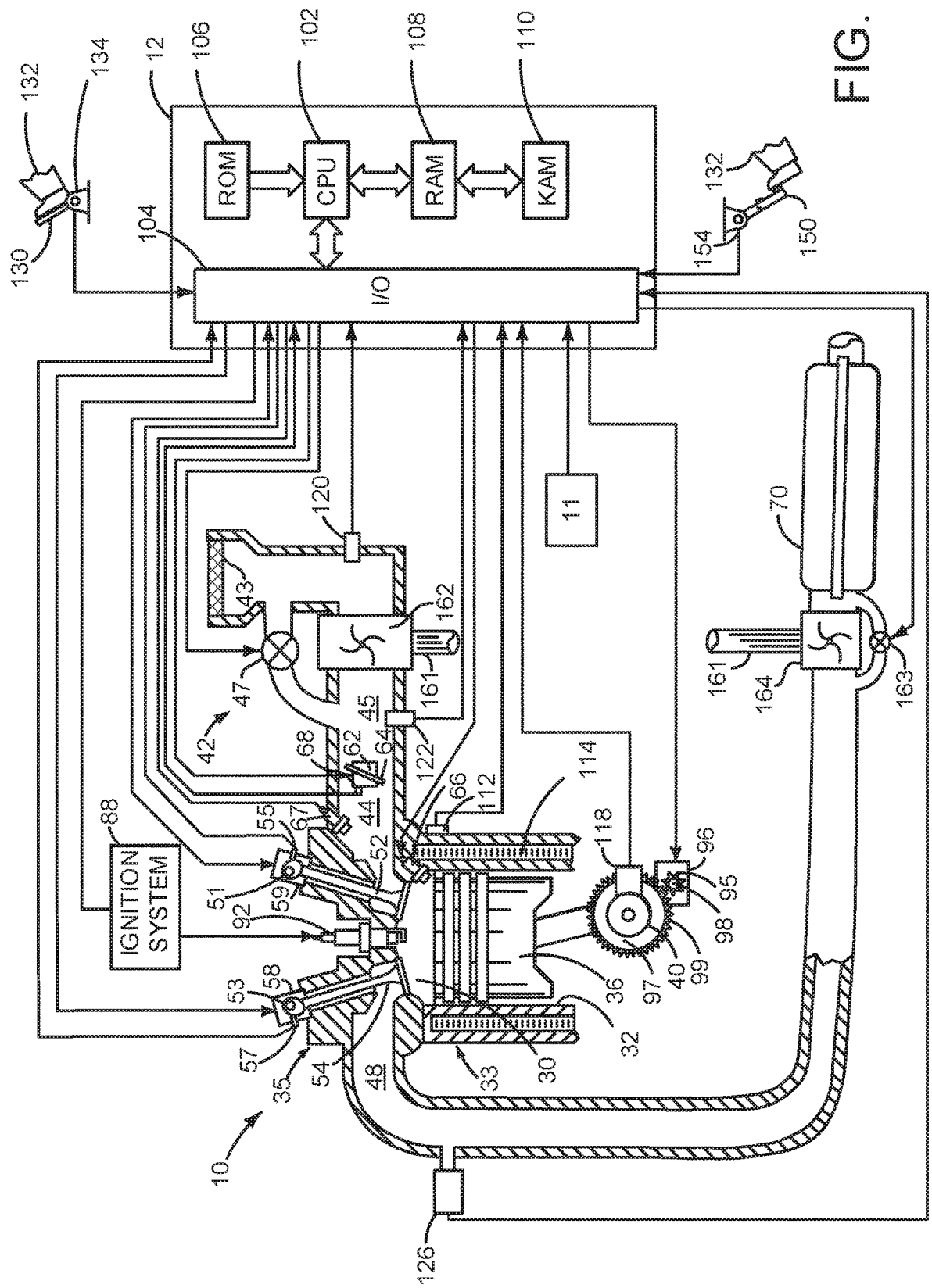
FIG. 1 is a schematic diagram of an engine.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1-3 and employs the actuators shown in FIGS. 1-3 to adjust engine and driveline operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 via solenoid 93 to engage ring gear 99. Starter 96 may be directly mounted to the front of the engine or the rear of the engine. In some examples, starter 96 may selectively supply power to crankshaft 40 via a belt or chain. In one example, starter 96 is in a base state when not engaged to the engine crankshaft 40 and flywheel ring gear 99.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electromechanical devices.

Direct fuel injector 66 is shown positioned to inject fuel directly into cylinder 30, which is known to those skilled in the art as direct injection. Port fuel injector 67 is shown positioned to inject fuel into the intake port of cylinder 30, which is known to those skilled in the art as port injection. Fuel injectors 66 and 67 deliver liquid fuel in proportion to pulse widths provided by controller 12. Fuel is delivered to fuel injectors 66 and 67 by a fuel system (not shown) including a fuel tank, fuel pump, and fuel rail (not shown).

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of three-way catalyst 70. Alternatively, a two-state exhaust gas oxygen sensor may be substituted for UEGO sensor 126.

Catalyst 70 may include multiple bricks and a three-way catalyst coating, in one example. In another example, multiple emission control devices, each with multiple bricks, can be used.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 (e.g., a human/machine interface) for sensing force applied by human driver 132; a position sensor 154 coupled to brake pedal 150 (e.g., a human/machine interface) for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start or stop the engine or vehicle may be generated via a human and input to the human/machine interface 11. The human/machine interface 11 may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational power of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel power or a wheel power level to provide a desired rate of vehicle deceleration. The requested desired wheel power may be provided by vehicle system controller 255 requesting a first braking power from electric machine controller 252 and a second braking power from engine controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or accelerate driveline and wheel rotation.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10 and electric machine 240. In other examples, engine 10 may be omitted. Engine 10 may be started with an engine starting system shown in FIG. 1, via BISG 219, or via driveline integrated starter/generator (ISG) 240 also known as an integrated starter/generator. A speed of BISG 219 may be determined via optional BISG speed sensor 203. Driveline ISG 240 (e.g., high voltage (operated with greater than 30 volts) electrical machine) may also be referred to as an electric machine, motor, and/or generator. Further, power of engine 10 may be adjusted via power actuator 204, such as a fuel injector, throttle, etc.

BISG 219 is mechanically coupled to engine 10 via belt 231. BISG may be coupled to crankshaft 40 or a camshaft (e.g., 51 or 53 of FIG. 1). BISG may operate as a motor when supplied with electrical power via electric energy storage device 275 or low voltage battery 280. BISG may operate as a generator supplying electrical power to electric energy storage device 275 or low voltage battery 280. Bi-directional DC/DC converter 281 may transfer electrical energy from a high voltage buss 274 to a low voltage buss 273 or vice-versa. Low voltage battery 280 is electrically coupled to low voltage buss 273. Electric energy storage device 275 is electrically coupled to high voltage buss 274. Low voltage battery 280 selectively supplies electrical energy to starter motor 96.

An engine output power may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

Disconnect clutch 236 may be fully closed when engine 10 is supplying power to vehicle wheels 216. Disconnect clutch 236 may be fully open when engine 10 is stopped (e.g., not combusting fuel) or when engine 10 is supplying power to BISG 219 and BISG 219 is generating electrical charge to charge electric energy storage device 275 or supplying electrical charge to ISG 240.

ISG 240 may be operated to provide power to powertrain 200 or to convert powertrain power into electrical energy to be stored in electric energy storage device 275 in a regeneration mode. ISG 240 is in electrical communication with energy storage device 275. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling power multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power directly relayed to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand power or power request from an accelerator pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 275, a charging power (e.g., a negative ISG power) may be requested while a non-zero driver demand power is present. Vehicle system controller 255 may request increased engine power to overcome the charging power to meet the driver demand power.

In response to a request to decelerate vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the ISG 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears 211 based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative power of ISG 240 may be limited (e.g., constrained to less than a threshold negative threshold power) based on operating conditions of electric energy storage device 275, by vehicle system controller 255, or electric machine controller 252. Any portion of desired negative wheel power that may not be provided by ISG 240 because of transmission or ISG limits may be allocated to engine 10 and/or friction brakes 218 so that the desired wheel power is provided by a combination of negative power (e.g., power absorbed) via friction brakes 218, engine 10, and ISG 240.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift lever may include positions for gears 1-N (where N is an upper gear number), D (drive), and P (park).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing. Brake controller 250 commands electrical brake actuator (e.g., an electrically actuated brake booster that amplifies force applied to a brake pedal or an alternative electrically actuated brake actuator) 223 to provide an electrically amplified braking torque or force (e.g., a braking force supplied via an electrically operated actuator) to activate brakes 218 to slow wheels 216. Electrical brake actuator 223 may be supplied electric power via low voltage battery 280 or electric energy storage device 275.

Referring now to FIG. 3, an example of an alternative driveline 300 is shown. Many of the driveline components shown in FIG. 2 are shown in FIG. 3 and these components operate as discussed in the description of FIG. 3. Components in FIG. 3 that are equivalent to the components in FIG. 2 include the same identification numbers as those shown in FIG. 2. As such, the description of these components may be omitted or shortened for the sake of brevity. Nevertheless, similar components may operate similarly.

FIG. 3 is a block diagram of a vehicle 225 including a powertrain or driveline 300. The powertrain of FIG. 3 includes engine 10 shown in FIG. 1. Powertrain 300 is shown including vehicle system controller 255, engine controller 12, transmission controller 254, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, transmission controller 254, and brake controller 250 to achieve driver input requests and other requests that are based on vehicle operating conditions. In some examples, controller 255 may operate as an autonomous driver, thereby generating engine torque requests, transmission gear shifts, and vehicle braking demands or requests.

For example, in response to a driver releasing an accelerator pedal and vehicle speed, vehicle system controller 255 may request a desired wheel power or a wheel power level to provide a desired rate of vehicle deceleration. The requested desired wheel power may be provided by vehicle system controller 255 requesting a first braking power from engine controller 12, thereby providing a desired driveline braking power at vehicle wheels 216. Vehicle system controller 255 may also request a friction braking power via brake controller 250. The braking powers may be referred to as negative powers since they may slow driveline and wheel rotation. Positive power may maintain or accelerate driveline and wheel rotation.

In this example, powertrain 200 may be powered by engine 10. Engine 10 may be started with an engine starting system shown in FIG. 1. Further, power of engine 10 may be adjusted via power or torque actuator 204, such as a fuel injector, throttle, etc. Engine 10 may supply vacuum to vacuum reservoir (e.g., a brake booster) 203. A vacuum level may be sensed via vacuum sensor 205. Low voltage battery 280 selectively supplies electrical energy to starter 96. Starter 96 may rotate pinion gear 95 shown in FIG. 1. Engine 10 supplies torque to torque converter 206 via crankshaft 40. Torque converter 206 includes a turbine 286 to output power to transmission input shaft 270. Transmission input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

Transmission 208 also includes an electric transmission pump 283*a* that pressurizes fluid to operate the forward clutch 210 and gear clutches 211. Pump 283*a* may be selectively activated and deactivated via transmission controller 254 responsive to vehicle operating conditions. Automatic transmission 208 also includes gear clutches (e.g., gears 1-10) 211 and forward clutch 210. Automatic transmission 208 is a fixed step ratio transmission. The gear clutches 211 and the forward clutch 210 may be selectively engaged to change a ratio of an actual total number of turns of input shaft 270 to an actual total number of turns of wheels 216 via hydraulic pressure that may be supplied via electric transmission pump 283. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218 via force provided by electric brake actuator 223. In one example, friction wheel brakes 218 may be engaged in response to a human driver pressing their foot on a brake pedal (not shown) and/or in response to instructions within brake controller 250. Further, brake controller 250 may apply brakes 218 via electric brake actuator 223 in response to information and/or requests made by vehicle system controller 255. In the same way, a frictional force may be reduced to wheels 216 by disengaging wheel brakes 218 via electric brake actuator 223 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or torque request from an accelerator pedal or other device. Vehicle system controller 255 then requests engine torque or power via engine controller 12. If the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft torque and vehicle speed.

In response to a request to decelerate vehicle 225, vehicle system controller 255 may provide a negative desired wheel power (e.g., desired or requested powertrain wheel power) based on vehicle speed and brake pedal position. Vehicle system controller 255 then allocates a fraction of the negative desired wheel power to the engine 10. Vehicle system controller may also allocate a portion of the requested braking power to friction brakes 218 (e.g., desired friction brake wheel power). Further, vehicle system controller may notify transmission controller 254 that the vehicle is in braking mode so that transmission controller 254 shifts gears 211 based on a unique shifting schedule to increase engine braking efficiency. Engine 10 may supply a negative power to transmission input shaft 270, but negative power provided by engine 10 may be limited by transmission controller 254 which outputs a transmission input shaft negative power limit (e.g., not to be exceeded threshold value). Any portion of desired negative wheel power that may not be provided by engine 10 may be allocated to friction brakes 218 so that the desired wheel power is provided by a combination of negative power (e.g., power absorbed) via friction brakes 218 and engine 10.

Accordingly, power control of the various powertrain components may be supervised by vehicle system controller 255 with local power control for the engine 10, transmission 208, and brakes 218 that may be provided via engine controller 12, transmission controller 254, and brake controller 250. The vehicle system controller 255 may also receive vehicle position data (e.g., road grade, vehicle position, vehicle speed) from global positioning system 256. Inclinometer 257 may also indicate road grade to vehicle system controller 255.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), gear shift lever sensors, and ambient temperature sensors. Transmission controller 254 may also receive requested gear input from gear shift selector 290 (e.g., a human/machine interface device). Gear shift lever may include positions for gears 1-N (where N is an upper gear number), D (drive), and P (park).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255. Brake controller 250 commands electrical brake actuator (e.g., an electrically actuated brake caliper) 223 to provide an electric braking torque or force (e.g., a braking force supplied via an electrically operated actuator) to activate brakes 218 to slow wheels 216. Electrical brake actuator 223 may be supplied electric power via low voltage battery 280 or electric energy storage device 275.

Thus, the system of FIGS. 1-3 provides for a system, comprising: an engine; and a controller including executable instructions stored in non-transitory memory to automatically stop the engine in response to a first electric assisted braking threshold during a first condition, and to automatically stop the engine in response to a second electric assisted braking threshold during a second condition. The system includes where the first condition is a vehicle speed less than a first speed, and where the second condition is a vehicle speed less than a second speed. The system further comprises additional instructions to adjust the first electric assisted braking threshold in response to vehicle speed. The system includes where adjusting the first electric assisted braking threshold in response to vehicle speed includes reducing the first electric assisted braking threshold in response to a reduction in vehicle speed.

Figure 4A:
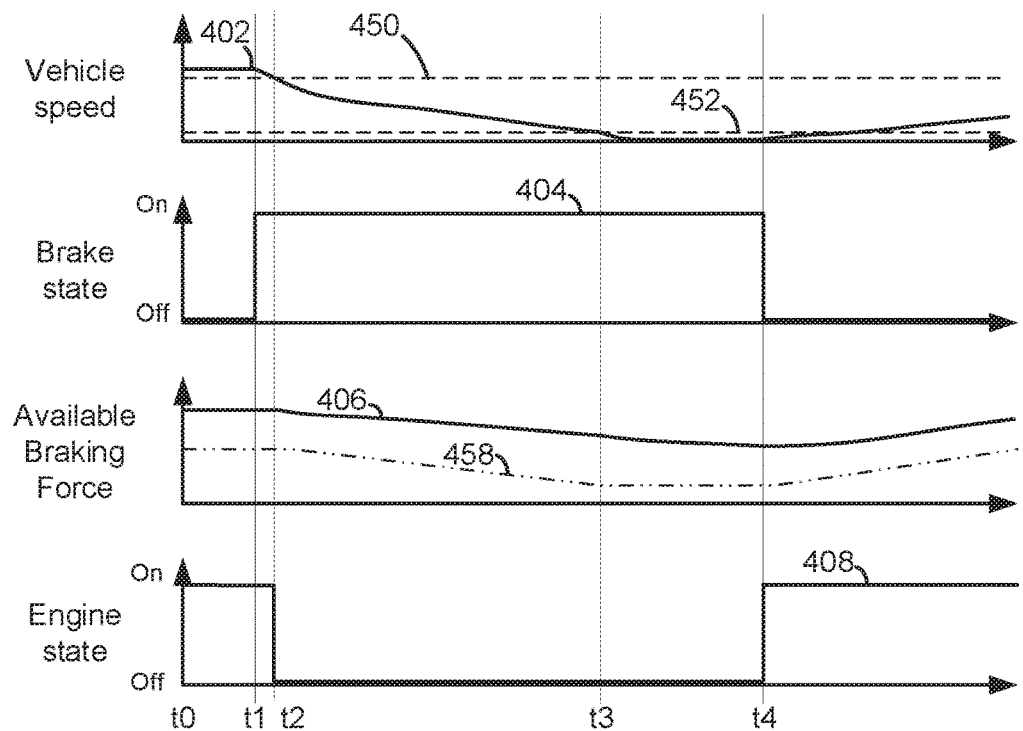
FIGS. 4A and 4B show example engine stopping sequences according to the method of FIG. 5.
Figure 5:
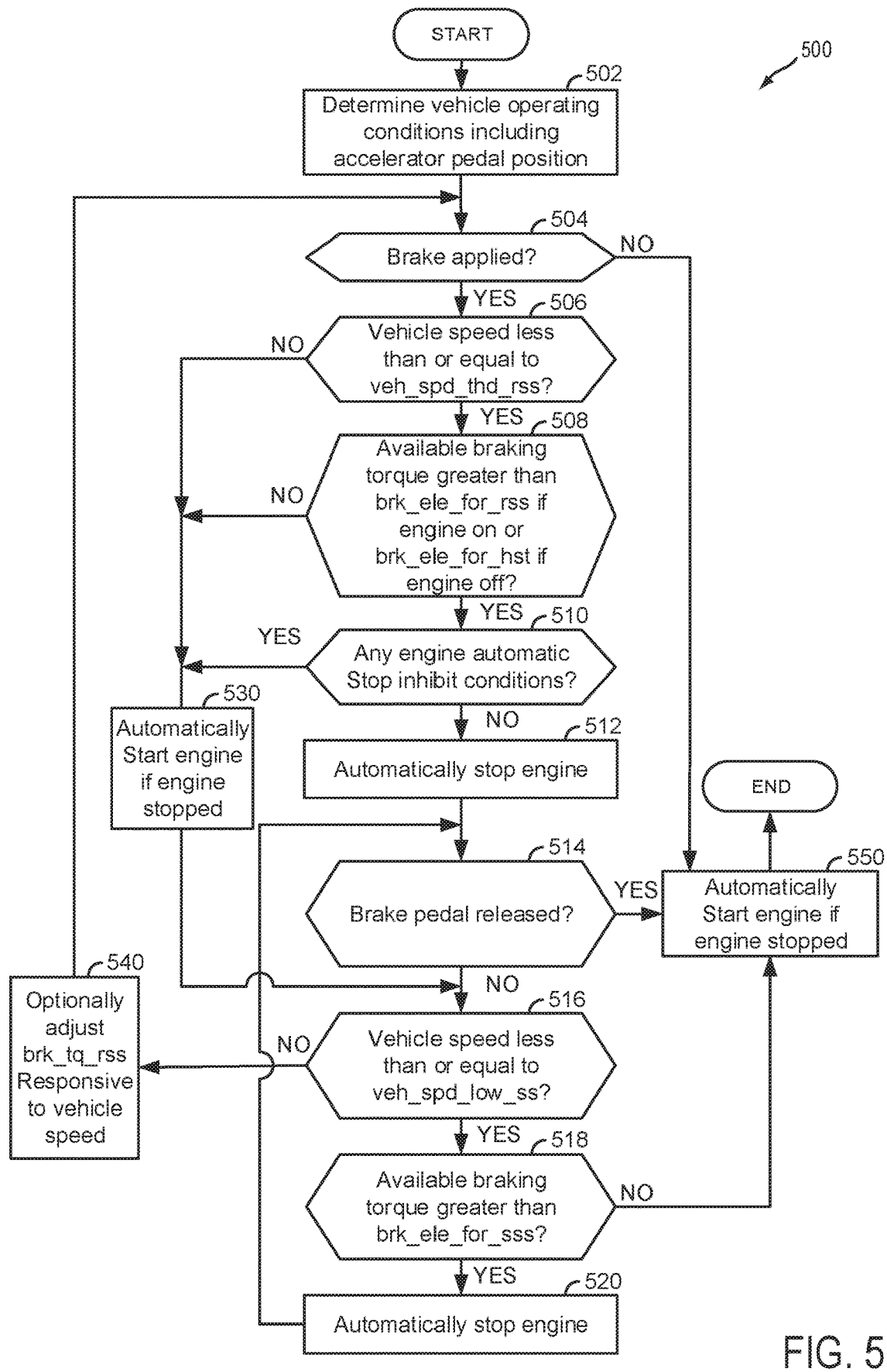
FIG. 5 shows a first method for operating an engine.

Referring now to FIG. 4A, a prophetic vehicle operating sequence according to the method of FIG. 5 and the system of FIGS. 1-3 is shown by way of several plots. The plots are aligned in time and occur at a same time. The vertical lines at t0-t4 show particular times of interest.

The first plot from the top of FIG. 4A is a plot of vehicle speed versus time. The vertical axis represents vehicle speed and vehicle speed increases in the direction of the vertical axis arrow. The horizontal axis represents time and time increases from the left side of the plot to the right side of the plot. Trace 402 represents vehicle speed. Dotted horizontal line 450 represents a threshold speed below which automatic engine stopping may occur for rolling vehicle conditions. Dotted horizontal line 452 represents a threshold speed below which automatic engine stopping may occur for steady-state vehicle conditions (e.g., the vehicle is considered stopped or nearly stopped).

The second plot from the top of FIG. 4A is a vehicle brake operating state versus time. The vertical axis represents the vehicle brake operating state and the vehicle brake is on, or it is applied, when trace 404 is near the vertical axis arrow. The vehicle brake is not on, or it is off, when trace 404 is near the horizontal axis. The vehicle brake may be applied via a human driver (not shown). The horizontal axis represents time and time increases from the left side of the plot to the right side of the plot. Trace 404 represents vehicle brake operating state.

The third plot from the top of FIG. 4A is a plot of available electric assisted braking force versus time. The vertical axis represents the available electric assisted braking force and the available electric assisted braking force increases in the direction of the vertical axis arrow. The horizontal axis represents time and the time increases from the left side of the figure to the right side of the figure. Trace 406 represents the available electric assisted braking force. The electric assisted braking force threshold 458 is a threshold below which the engine may not be automatically stopped. In particular, the engine may not be automatically stopped when available electric assisted braking force level 406 is less than or below electric assisted braking force threshold 458. The electric assisted braking force threshold 458 may be equal to a rolling vehicle engine stop start electric assisted braking force threshold when vehicle speed is less than a first threshold speed and greater than a second threshold speed. The electric assisted braking force threshold 458 may be equal to a steady-state vehicle engine stop start electric assisted braking force threshold when vehicle speed is less than the second threshold speed.

The fourth plot from the top of FIG. 4A is a plot of engine operating state versus time. The vertical axis represents engine operating state and the engine is operating (e.g., crankshaft is rotating and the engine is combusting fuel) when trace 408 is at a higher level near the vertical axis arrow. The engine is stopped or off (e.g., crankshaft not rotating and not combusting fuel) when trace 408 is at a lower level near the horizontal axis. The horizontal axis represents time and the time increases from the left side of the figure to the right side of the figure. Trace 408 represents the engine operating state.

At time t0, the engine is running (e.g., combusting fuel and rotating) and vehicle speed is above threshold 450. The vehicle brake is not applied and available electric assisted braking force is at a higher level above the electric assisted braking force threshold 458.

At time t1, the vehicle brakes are applied via the vehicle operator (not shown) and the vehicle speed begins to be reduced. The available electric assisted braking force is decreased in response to the vehicle brakes being applied, but the available electric assisted braking force remains above threshold 458. The engine remains on because vehicle speed is above threshold 450.

At time t2, the vehicle speed falls below threshold 450 while the available electric assisted braking force remains above threshold 458. Therefore, the engine is automatically stopped while the vehicle brakes continue to be applied.

Between time t2 and time t3, the vehicle speed continues to decline and the engine remains stopped (e.g., not combusting fuel and not rotating). The electric assisted braking force threshold 458 is reduced in proportion with the reduction in vehicle speed and the available electric assisted braking force declines a small amount as electric power is consumed to operate the vehicle's brakes while the engine is deactivated.

At time t3, the vehicle speed falls below the a threshold speed below which automatic engine stopping may occur for steady-state vehicle conditions 452 so the electric assisted braking force threshold 458 is adjusted to a level that is based on the threshold speed below which automatic engine stopping may occur for steady-state vehicle conditions 452. The vehicle brake continues to be applied and the available electric assisted braking force level declines a small amount since the brake pedal is applied a constant amount (not shown). The engine also remains stopped.

At time t4, the human or autonomous driver releases the vehicle brake causing the engine to be automatically started. The available electric assisted braking amount increases as the engine begins to deliver charge to the vehicle's battery (not shown). The vehicle speed begins to increase and the electric assisted braking force threshold 458 is increased as the vehicle speed increases.

In this way, an engine may be automatically stopped and started responsive to an available electric assisted braking threshold that is adjusted as a function of vehicle speed. At higher vehicle speeds, greater electric assisted braking force amounts may be requested to automatically stop the engine. At lower vehicle speeds, less electric assisted braking force may be requested to automatically stop the engine.

Figure 4B:
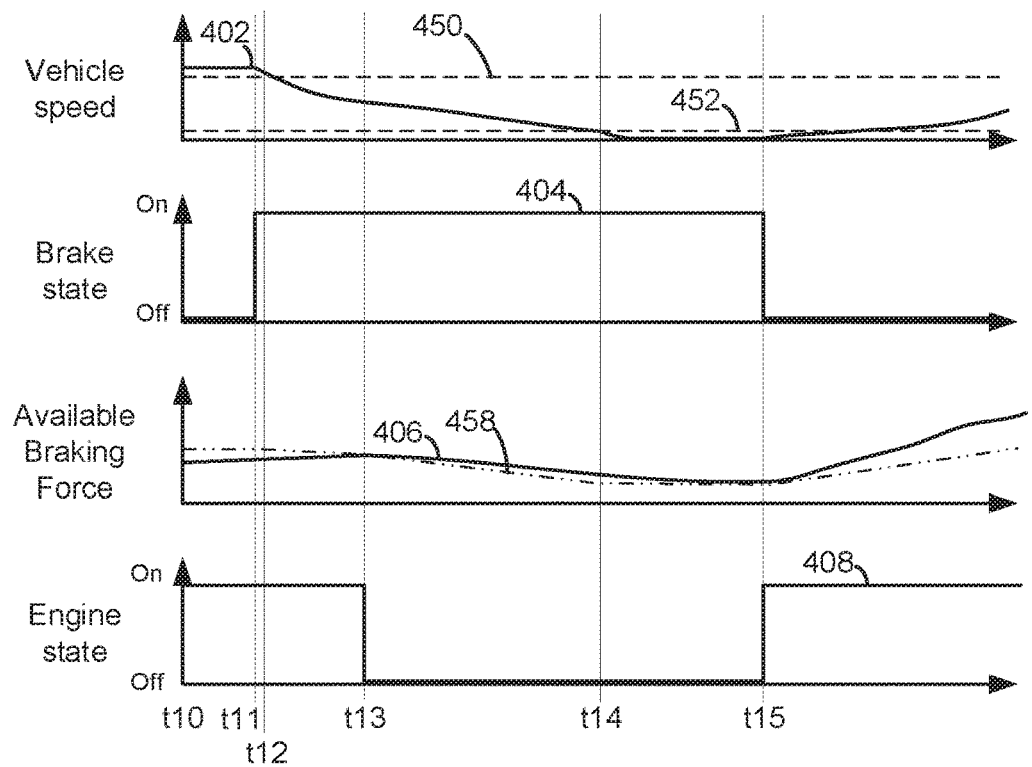

Referring now to FIG. 4B, a prophetic vehicle operating sequence according to the method of FIG. 5 and the system of FIGS. 1-3 is shown by way of several plots. The plots are aligned in time and occur at a same time. The vertical lines at t10-t15 show particular times of interest. The variables and thresholds shown in the plots of FIG. 4B are the same variables and thresholds shown in the plots of FIG. 4A, except the values of the variables and thresholds may be different to reflect different vehicle operating conditions. Therefore, for the sake of brevity the description of each of the plots is omitted.

At time t10, the engine is running (e.g., combusting fuel and rotating) and vehicle speed is above threshold 450. The vehicle brake is not applied and available electric assisted braking force 406 is at a lower level that is below the electric assisted braking force threshold 458. The available electric assisted braking force 406 is increasing since the engine is running (e.g., rotating and combusting fuel) to provide charge to the electric assisted braking system.

At time t11, the vehicle brakes are applied via the vehicle operator (not shown) and the vehicle speed begins to be reduced. The available electric assisted braking force 406 continues to increase since the engine remains activated. The vehicle brakes are applied and the vehicle speed begins to be reduced. The electric assisted braking threshold 458 begins to decrease as the vehicle speed begins to decrease. The available electric assisted braking force 406 remains below the electric assisted braking threshold 458, so the engine remains activated.

At time t12, the vehicle speed falls below threshold 450 while the available electric assisted braking force 406 remains below the electric assisted braking force threshold 458, so the engine remains running. The available electric assisted braking force 406 continues to increase as the engine supplies charge to the vehicle electrical system. The vehicle brakes remain in an applied state.

At time t13, the vehicle speed continues to decline and now the available electric assisted braking force 406 exceeds the electric assisted braking force threshold 458, so the engine is automatically stopped. The engine is stopped because there is sufficient brake force to provide a desired rate of vehicle deceleration.

Between time t13 and time t14, the vehicle speed continues to decline and the engine remains stopped (e.g., not combusting fuel and not rotating). The electric assisted braking force threshold 458 is reduced in proportion with the reduction in vehicle speed and the available electric assisted braking force decreases, but it remains above the electric assisted braking force threshold 458. The engine remains off.

At time t14, the vehicle speed falls below the threshold speed below which automatic engine stopping may occur for steady-state vehicle conditions 452. Therefore, the electric assisted braking force threshold 458 is adjusted to a level that is based on the threshold speed below which automatic engine stopping may occur for steady-state vehicle conditions 452. The vehicle brake continues to be applied and the available electric assisted braking force continues to decline, but it remains above the electric assisted braking force threshold 458. The engine also remains stopped.

At time t15, the human or autonomous driver releases the vehicle brake causing the engine to be automatically started. The available electric assisted braking force begins to increase as the engine rotates and delivers electric charge to the vehicle's electrical system. The vehicle speed begins to increase and the electric assisted braking force threshold 458 is increased as the vehicle speed increases.

In this way, automatic stopping of an engine may be delayed until an available electric assisted braking force level or amount exceeds threshold 458 so that a desired level of electric assisted braking force may be available after the engine is automatically stopped.

Referring now to FIG. 5, a flow chart of a method for operating a vehicle in a way that provides for automatic engine stopping is shown. The method of FIG. 5 may be incorporated into and may cooperate with the system of FIGS. 1-3. Further, at least portions of the method of FIG. 5 may be incorporated as executable instructions stored in non-transitory memory while other portions of the method may be performed via a controller transforming operating states of devices and actuators in the physical world.

At 502, method 500 determines vehicle operating conditions. Vehicle operating conditions may include but are not limited to vehicle speed, engine speed, engine temperature, electric energy storage device state of charge (SOC), brake pedal position, brake boost vacuum level, road grade, engine operating state, and accelerator pedal position. Method 500 proceeds to 504.

At 504, method 500 judges if a vehicle brake is applied. In one example, method 500 may judge that a vehicle brake is applied if a vehicle brake pedal is applied. If method 500 judges that a vehicle brake is applied, then the answer is yes and method 500 proceeds to 506. Otherwise, the answer is no and method 500 proceeds to 550.

At 550, method 500 operates the engine according to vehicle operating conditions. For example, method 400 may adjust the engine throttle and fuel injectors to provide a requested driver demand torque as determined from accelerator pedal position and vehicle speed. Further, if the engine is stopped, method 500 automatically starts the engine via rotating the engine via an electric machine and supplying fuel to the engine. If an engine stop is manually requested by the vehicle's human driver, then the engine may be stopped (e.g., the engine's crankshaft ceases rotating and the engine ceases combusting fuel). Method 500 proceeds to exit.

At 506, method 500 judges whether or not the present vehicle speed is less than or equal to a rolling vehicle speed threshold for engine stop/start (veh_spd_thd_rss). The rolling vehicle speed threshold for engine stop/start may be a higher threshold speed (e.g., 40 kilometers/hr). If method 500 judges that the present vehicle speed is less than or equal to the rolling vehicle speed threshold for engine stop/start (veh_spd_thd_rss), then the answer is yes and method 500 proceeds to 508. Otherwise, the answer is no and method 500 proceeds to 530.

At 508, method 500 judges whether or not the present available electric assisted braking force amount or level is greater than or equal to a rolling vehicle electric assisted braking force threshold (brk_ele_for_rss) if the vehicle's engine is on (e.g., rotating and combusting fuel), or if the present available electric assisted braking force amount is greater than or equal to a rolling vehicle brake boost vacuum threshold plus an offset level (brk_ele_for_rss_hst) if the vehicle's engine is off (e.g., not rotating and not combusting fuel). If method 500 judges that the present available electric assisted braking force is greater than or equal to a rolling vehicle electric assisted braking force threshold if the vehicle's engine is on (e.g., rotating and combusting fuel), or if the present available electric assisted braking force is greater than or equal to a rolling vehicle electric assisted braking force threshold plus an offset level if the vehicle's engine is off (e.g., not rotating and not combusting fuel), then the answer is yes and method 500 proceeds to 510. Otherwise, the answer is no and method 500 proceeds to 530.

The available electric assisted braking force amount may be determined via battery SOC, electric brake actuator temperature, and ambient temperature. In one example, an available electric assisted braking fore amount may be empirically determined via monitoring battery SOC, electric brake actuator temperature, and ambient temperature. The empirically determined values may be stored in a table or function and the table or function may be referenced or indexed via battery SOC, electric brake actuator temperature, and ambient temperature. The table or function outputs the available electric braking force amount.

At 510, method 500 judges whether or not any automatic engine stop inhibit conditions are present. Automatic engine stop inhibit conditions may include battery state of charge being less than a threshold battery state of charge, engine temperature less than a threshold temperature, and other conditions. If so, then the answer is yes and method 500 proceeds to 530. If not, then the answer is no and method 500 proceeds to 512.

At 512, method 500 automatically stops (e.g., ceases engine rotation and combustion within the engine) the engine by ceasing to deliver fuel to the engine via the fuel injectors. In addition, method 500 may cease to deliver spark to the engine. Further, method 500 may fully open a driveline disconnect clutch when the engine is automatically stopped so that the driveline may continue to rotate without having to rotate the engine. Method 500 proceeds to 514.

At 514, method 500 judges whether or not the vehicle's brake pedal is fully released. If so, then the answer is yes and method 500 proceeds to 550. If not, then the answer is no and method 500 proceeds to 516.

At 516, method 500 judges whether or not a present vehicle speed is less than a steady-state vehicle speed threshold (veh_spd_low_ss). If so, then the answer is yes and method 500 proceeds to 518. If not, then the answer is no and method 500 proceeds to 540.

At 540, method 500 optionally adjusts the rolling vehicle speed threshold for engine stop/start (veh_spd_thd_rss) in proportion to vehicle speed. For example, if vehicle speed decreases by 10% the rolling vehicle speed threshold for engine stop/start (veh_spd_thd_rss) may be reduced by 10%. Method 500 returns to 504.

At 518, method 500 judges whether or not a present available electric assisted braking force amount is greater than the steady-state vehicle electric assisted braking force threshold (brk_ele_for_sss). If so, then the answer is yes and method 500 proceeds to 520. If not, then the answer is no and method 500 proceeds to 550. In addition, in some examples, method 500 may proceed to 550 if the brake pedal is fully released.

At 520, method 500 automatically stops the engine. The engine may be automatically stopped by ceasing to supply spark and fuel to the engine. Further, method 500 may fully open a driveline disconnect clutch when the engine is automatically stopped so that the driveline may continue to rotate without having to rotate the engine. Method 500 returns to 514. At 530, method 500 automatically starts the engine if the engine is stopped. Further, method 500 operates the engine according to vehicle operating conditions. Method 500 proceeds to 516.

In this way, the automatic engine stopping may occur or may be inhibited based on an amount of available electric assisted braking force so that there may be a desired amount of braking force for the vehicle. Further, the electric assisted braking threshold level may be adjusted as a function of vehicle speed so that unnecessarily high levels of electric assisted braking force may not be the basis for preventing automatically stopping of the engine. Consequently, the engine may not be required to consume fuel to produce excess electric assisted braking force.

Figure 6:
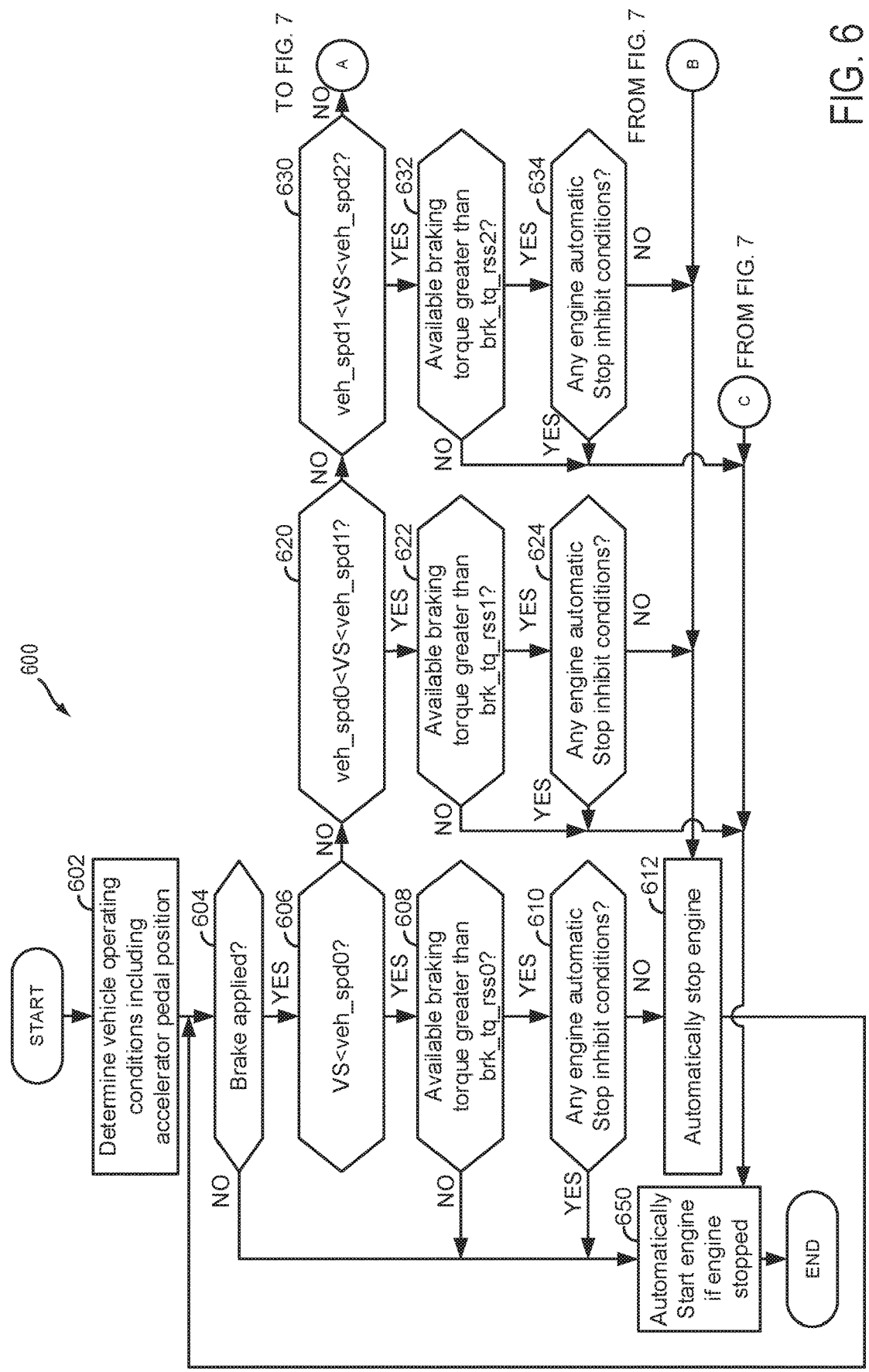
FIGS. 6 and 7 show a second method for operating an engine.

Referring now to FIG. 6, a flow chart of a second method for operating a vehicle in a way that provides for automatic engine stopping is shown. The method of FIG. 6 may be incorporated into and may cooperate with the system of FIGS. 1-3. Further, at least portions of the method of FIG. 6 may be incorporated as executable instructions stored in non-transitory memory while other portions of the method may be performed via a controller transforming operating states of devices and actuators in the physical world.

At 602, method 600 determines vehicle operating conditions. Vehicle operating conditions may include but are not limited to vehicle speed, engine speed, engine temperature, electric energy storage device state of charge (SOC), brake pedal position, brake boost vacuum level, road grade, engine operating state, and accelerator pedal position. Method 600 proceeds to 604.

At 604, method 600 judges if a vehicle brake is applied. In one example, method 600 may judge that a vehicle brake is applied if a vehicle brake pedal is applied. If method 600 judges that a vehicle brake is applied, then the answer is yes and method 600 proceeds to 606. Otherwise, the answer is no and method 500 proceeds to 650.

At 650, method 600 operates the engine according to vehicle operating conditions. Further, if the engine is stopped, method 600 automatically starts the engine via rotating the engine via an electric machine and supplying fuel to the engine. If an engine stop is manually requested by the vehicle's human driver, then the engine may be stopped (e.g., the engine's crankshaft ceases rotating and the engine ceases combusting fuel). Method 600 proceeds to exit.

At 606, method 600 judges if vehicle speed (Vs) is less than or equal to a first vehicle speed threshold veh_spd0. If so, the answer is yes and method 600 proceeds to 608. Otherwise, the answer is no and method 600 proceeds to 620.

At 608, method 600 judges if an available electric assisted braking force amount is greater than a first electric assisted braking force threshold brk_ele_for_rss0. If so, the answer is yes and method 600 proceeds to 610. Otherwise, the answer is no and method 600 proceeds to 650.

At 610, method 600 judges whether or not any automatic engine stop inhibit conditions are present. Automatic engine stop inhibit conditions may include battery state of charge being less than a threshold battery state of charge, engine temperature less than a threshold temperature, and other conditions. If so, then the answer is yes and method 600 proceeds to 650. If not, then the answer is no and method 600 proceeds to 612.

At 612, method 600 automatically stops the engine. The engine may be automatically stopped via ceasing to inject fuel to the engine. Further, method 600 may cease delivery of spark to the engine. Method 600 returns to 604.

At 620, method 600 judges if vehicle speed (Vs) is less than or equal to a second vehicle speed threshold veh_spd1. If so, the answer is yes and method 600 proceeds to 622. Otherwise, the answer is no and method 600 proceeds to 620.

At 622, method 600 judges if an available electric assisted braking force amount is greater than a second electric assisted braking force threshold brk_ele_for_rss1. If so, the answer is yes and method 600 proceeds to 624. Otherwise, the answer is no and method 600 proceeds to 650.

At 624, method 600 judges whether or not any automatic engine stop inhibit conditions are present. Automatic engine stop inhibit conditions may include battery state of charge being less than a threshold battery state of charge, engine temperature less than a threshold temperature, and other conditions. If so, then the answer is yes and method 600 proceeds to 650. If not, then the answer is no and method 600 proceeds to 612.

At 630, method 600 judges if vehicle speed (Vs) is less than or equal to a third vehicle speed threshold veh_spd2. If so, the answer is yes and method 600 proceeds to 632. Otherwise, the answer is no and method 600 proceeds to 640.

At 632, method 600 judges if an available electric assisted braking force amount is greater than a third electric assisted braking force threshold brk_ele_for_rss2. If so, the answer is yes and method 600 proceeds to 634. Otherwise, the answer is no and method 600 proceeds to 650.

At 634, method 600 judges whether or not any automatic engine stop inhibit conditions are present. Automatic engine stop inhibit conditions may include battery state of charge being less than a threshold battery state of charge, engine temperature less than a threshold temperature, and other conditions. If so, then the answer is yes and method 600 proceeds to 650. If not, then the answer is no and method 600 proceeds to 612.

At 640, method 600 judges if vehicle speed (Vs) is less than or equal to a fourth vehicle speed threshold veh_spd3. If so, the answer is yes and method 600 proceeds to 642. Otherwise, the answer is no and method 600 proceeds to 650.

At 642, method 600 judges if an available electric assisted braking force amount is greater than a fourth electric assisted braking force threshold brk_ele_for_rss3. If so, the answer is yes and method 600 proceeds to 644. Otherwise, the answer is no and method 600 proceeds to 650.

At 644, method 600 judges whether or not any automatic engine stop inhibit conditions are present. Automatic engine stop inhibit conditions may include battery state of charge being less than a threshold battery state of charge, engine temperature less than a threshold temperature, and other conditions. If so, then the answer is yes and method 600 proceeds to 650. If not, then the answer is no and method 600 proceeds to 612.

Figure 7:
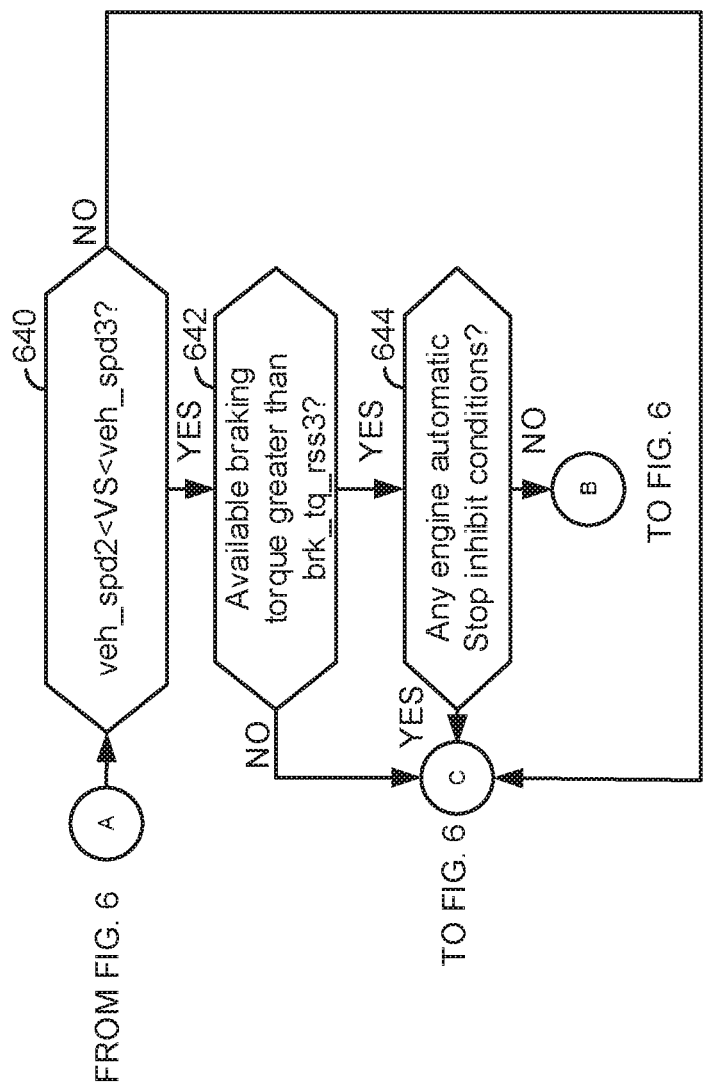

Thus, the methods of FIGS. 5-7 provide for an engine operating method, comprising: automatically stopping an engine via a controller in response to an available electric assisted braking force being greater than a first threshold when a speed of a vehicle is less than a vehicle speed threshold; and automatically stopping the engine via the controller in response to the available electric assisted braking force being greater than a second threshold when the speed of the vehicle is greater than the vehicle speed threshold. The method includes where the first threshold is less than the second threshold. The method includes where automatically stopping the engine includes ceasing to supply fuel to the engine. The method includes where a crankshaft of the engine ceases to rotate after automatically stopping the engine. The method further comprises automatically stopping the engine in further response to the speed of the vehicle being less than a second vehicle speed threshold in combination with the available electric assisted braking force being greater than the second threshold. The method further comprises adding an offset available electric assisted braking force to the second threshold after automatically stopping the engine. The method further comprises automatically starting the engine in response to fully releasing a brake pedal. The method further comprises automatically stopping the engine in further response to a brake pedal being applied when automatically stopping the engine in response to the electric assisted braking force being greater than the first threshold when the speed of the vehicle is less than the vehicle speed threshold.

The method of FIGS. 5-7 provides for an engine operating method, comprising: adjusting an electric assisted braking force threshold via a controller in response to a vehicle speed; and automatically stopping an engine via the controller in response to the electric assisted braking force threshold. The method further comprises decreasing the electric assisted braking threshold in response to a decreasing vehicle speed. The method further comprises increasing the electric assisted braking threshold in response to an increasing vehicle speed. The method further comprises adding an offset to the electric assisted braking threshold after automatically stopping an engine. The method further comprises automatically starting the engine in response to fully releasing a brake pedal. The method includes where automatically stopping the engine includes ceasing to supply the engine with fuel. The method further comprises automatically stopping the engine in further response to a brake pedal being applied. The method includes where the electric assisted braking threshold is adjusted in proportion to the vehicle speed.

In another representation, the methods of FIGS. 5-7 provide for an engine operating method, comprising: providing a plurality of electric assisted braking force thresholds and a plurality of vehicle speed thresholds; and permitting automatic engine stopping in response to an available amount of electric assisted braking force being greater than one of the plurality of electric assisted braking force thresholds. The method further comprises preventing automatic engine stopping in response to the available amount of electric assisted braking force being less than one of the plurality of electric assisted braking force thresholds. The method includes where a unique electric assisted braking threshold is provided for each of the plurality of electric assisted braking thresholds.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. An engine operating method, comprising:
automatically stopping an engine via a controller in response to an available electric assisted braking force being greater than a first threshold when a speed of a vehicle is less than a vehicle speed threshold; and
automatically stopping the engine via the controller in response to the available electric assisted braking force being greater than a second threshold when the speed of the vehicle is greater than the vehicle speed threshold, where the first threshold is less than the second threshold.

2. The method of claim 1, where automatically stopping the engine includes ceasing to supply fuel to the engine.

3. The method of claim 1, where a crankshaft of the engine ceases to rotate after automatically stopping the engine.

4. The method of claim 1, further comprising automatically stopping the engine in further response to the speed of the vehicle being less than a second vehicle speed threshold in combination with the available electric assisted braking force being greater than the second threshold.

5. The method of claim 1, further comprising adding an offset available electric assisted braking force to the second threshold after automatically stopping the engine.

6. The method of claim 1, further comprising automatically starting the engine in response to fully releasing a brake pedal.

7. The method of claim 1, further comprising automatically stopping the engine in further response to a brake pedal being applied when automatically stopping the engine in response to the electric assisted braking force being greater than the first threshold when the speed of the vehicle is less than the vehicle speed threshold.

8. An engine operating method, comprising:
adjusting an electric assisted braking force threshold via a controller in response to a vehicle speed;
automatically stopping an engine via the controller in response to the electric assisted braking force threshold; and decreasing the electric assisted braking force threshold in response to a decreasing vehicle speed.

9. The method of claim 8, further comprising increasing the electric assisted braking force threshold in response to an increasing vehicle speed.

10. The method of claim 8, further comprising adding an offset to the electric assisted braking force threshold after automatically stopping an engine.

11. The method of claim 10, further comprising automatically starting the engine in response to fully releasing a brake pedal.

12. The method of claim 8, where automatically stopping the engine includes ceasing to supply the engine with fuel.

13. The method of claim 8, further comprising automatically stopping the engine in further response to a brake pedal being applied.

14. The method of claim 13, where the electric assisted braking threshold is adjusted in proportion to the vehicle speed.

15. A system, comprising:
an engine; and
a controller including executable instructions stored in non-transitory memory to automatically stop the engine in response to available braking torque being greater than a first electric assisted braking threshold during a first condition, and to automatically stop the engine in response to available braking torque being greater than a second electric assisted braking threshold during a second condition, where adjusting the first electric assisted braking threshold in response to vehicle speed includes reducing the first electric assisted braking threshold in response to a reduction in vehicle speed.

16. The system of claim 15, where the first condition is a vehicle speed less than a first speed, and where the second condition is a vehicle speed less than a second speed.

17. The system of claim 15, further comprising additional instructions to adjust the first electric assisted braking threshold in response to vehicle speed.

* * * * *